(12) United States Patent
Horspool et al.

(10) Patent No.: US 6,538,994 B1
(45) Date of Patent: Mar. 25, 2003

(54) MONITORING OF CONNECTION BETWEEN AN ETHERNET HUB AND AN END STATION

(75) Inventors: Nigel Horspool, Tervuren (BE); Paul J. Moran, Hemel Hempstead (GB); David J. Law, Kempston (GB); Paul Cramphorn, Kings Langley (GB)

(73) Assignee: 3Com Technologies, Georgetown (KY)

( * ) Notice: Subject to any disclaimer, the term of this patent is extended or adjusted under 35 U.S.C. 154(b) by 0 days.

(21) Appl. No.: 09/286,474

(22) Filed: Apr. 6, 1999

(30) Foreign Application Priority Data

May 20, 1998 (GB) .............................................. 9810810

(51) Int. Cl.$^7$ ............................................ G01R 31/08
(52) U.S. Cl. ....................................... 370/230; 370/468
(58) Field of Search ................................ 370/230, 231, 370/232, 233, 234, 235, 237, 238, 358, 391, 395.64, 395.65, 450, 459, 465, 468

(56) References Cited

U.S. PATENT DOCUMENTS

| 5,650,993 | A | * | 7/1997 | Lakshman et al. | ............. 370/17 |
| 5,946,301 | A | * | 8/1999 | Swanson et al. | ............. 370/252 |
| 6,141,350 | A | * | 10/2000 | Mahale et al. | ............... 370/438 |
| 6,148,002 | A | * | 11/2000 | Patel et al. | .................. 370/438 |
| 6,198,727 | B1 | * | 3/2001 | Wakeley et al. | ............. 370/247 |

* cited by examiner

Primary Examiner—Alpus H. Hsu
Assistant Examiner—Thien D Tran
(74) Attorney, Agent, or Firm—Nixon & Vanderhye P.C.

(57) ABSTRACT

A data connection between two network stations such as an Ethernet hub and an end station which are both capable of exchanging data at the higher of two rates, the higher rate being selected by an auto-negotiation process, is monitored for the occurrence of error represented by a symbol representing the start of a data packet immediately followed by an idle symbol. The rate of occurrence of such errors is compared against a threshold and the speed of the data connection is downgraded to the lower rate.

8 Claims, 2 Drawing Sheets

MONITORING OF CONNECTION BETWEEN AN ETHERNET HUB AND AN END STATION

FIELD OF THE INVENTION

This invention relates to packet-switched data communication networks, and particularly an Ethernet network or similar network wherein data may be transferred between two network stations, such as a hub or switch and another network station (particularly an end station such as a personal computer), at least two different rates, the hub and the other network station being able to establish a selected data rate by means of auto-negotiation. The invention is particularly though not necessarily exclusively intended for use with an auto-negotiation scheme as defined in IEEE 802.3u.

BACKGROUND OF THE INVENTION

As switching and other technology has improved, the rate at which data may be transferred between network devices has increased. Currently there are various standards to which successive generations of network devices have been designed to operate. In particular, a standard data rate of 10 megabits per second has been partly planted by a standard of 100 megabits per second and is expected to be supplanted by an even faster rate, 1000 megabits per second. However, network devices operating according to obsolescent standards (i.e. the lower data rate) continued to be used. It therefore follows that it is known for a network switch or hub to be capable of exchanging data with another network station at a plurality of different selectable rates. It is also known, and specified in for example in the above mentioned network standard, for a hub and a station to which it is connected to commence a 'conversation' by a process of 'auto-negotiation', wherein a network hub or switch establishes by means of interrogation and response whether the other station is capable of transmitting and receiving data at the higher of two rates (or a rate which is practically the highest of a multiplicity of rates) so that thereafter the two stations exchange information or transmit information from one to the other at the selected higher or highest rate.

It is also known to maintain a connection between a hub and another station by means of a continuous sequence of symbols representing an 'idle' state. When one station at either end of the connection wishes to send data then by convention it sends at least a first symbol followed by a second symbol, representing a 'carrier' signal. The data then follows in the format defined by the appropriate standard. At the end of the data packet a third predetermined symbol followed by a fourth predetermined symbol is sent, so as to represent the end of the carrier. Such a sequence is conventionally repeated for each and every packet transmitted between the stations.

BRIEF SUMMARY OF THE INVENTION

The present invention particularly relates to systems of this character and is concerned with a process for use with an auto-negotiation process, to monitor the quality of the connection, particularly a cable connecting a port on a network station to an end station.

If a multi-speed connection is used with badly installed cable or a cable or other link which does not meet an appropriate performance specification, then the reliability and throughput of the connection will be much reduced. The object of the present invention is to detect, by the monitoring of specific errors, the quality of the connection and, should the error rate representing a parameter of the quality of the cable exceed some selectable threshold, to cause the reduction of the data rate for the connection to a lower rate.

The present invention is based on the detection of the corruption of isolated idle symbols into a first symbol which would normally indicate the start of a data packet but is identifiable as an error when followed by an idle symbol. This specific form of error, known as false carrier and by convention written 'FalseCarrier', may be used as a reliable parameter of the quality of a connection between a hub and an end station in accordance with the invention.

In a preferred form of the invention, the method may be implemented on a 10/100 megabit per second hub repeater that uses auto-negotiation, as defined in IEEE 802.3u, to determine the data rate for a connection between the hub repeater and an end station. The 100 megabit per second connection transmits a sequence of 'idle' symbols to establish and maintain the link between the repeater and the end station. If these symbols are corrupted and the error rate of the false carriers increases above a certain threshold then the link may be downgraded to a data rate of 10 megabit per second.

DETAILED DESCRIPTION OF PREFERRED EMBODIMENT

Figure 1:
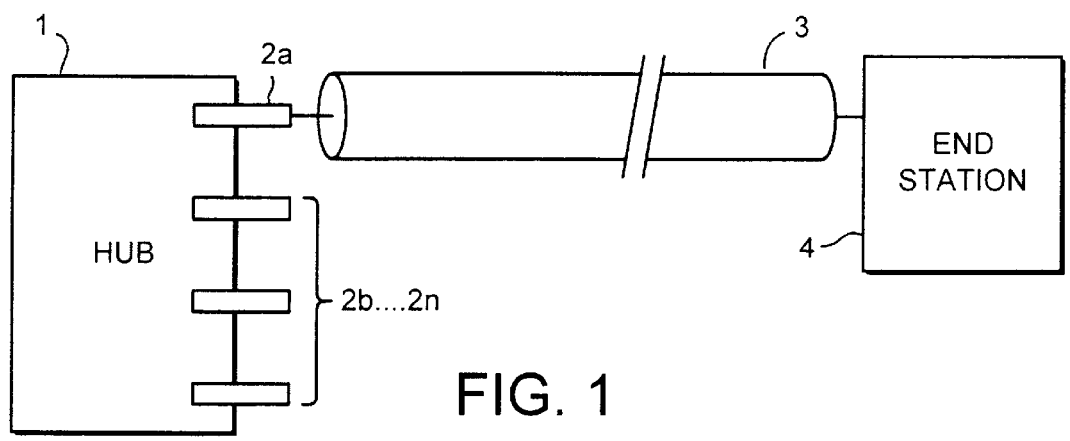
FIG. 1 illustrates schematically a hub connected to an end station.
Figure 2:
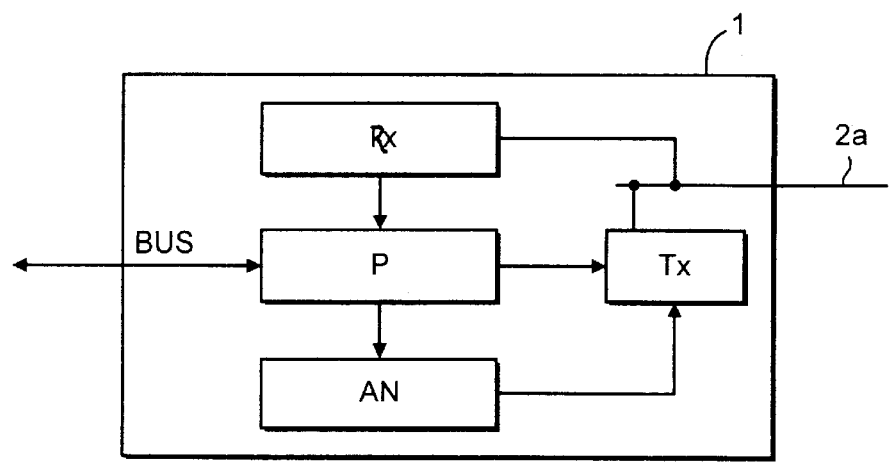
FIG. 2 is a schematic representation of certain operational functions within the hub.

FIG. 1 and FIG. 2 illustrate schematically, as indicated previously, a hub connected to an end station and certain operational functions within a hub. The representation is schematic only, because hubs such as Ethernet hubs and other devices operating according to a dual standard such as 10/100 megabits per second are well known in the art and the process of auto-negotiation is also well known, being defined in the aforementioned IEEE standard.

FIG. 1 illustrates therefore an Ethernet hub 1 having a plurality of ports 2a, 2b. . . 2n, to which port 2a is shown as connected by way of a cable connection 3 to another network station, particularly an end station such as a personal computer 4. The hub 1 may have many connections to other end stations, but each of these is an independent point to point link. The hub may be a stackable hub composed of a multiplicity of stacked hub units disposed to form a single logical entity whereby data received at any port on any of the units may be transmitted from any other port on any of the stacked units.

FIG. 2 illustrates in greatly simplified manner some of the functions associated with at least one of the ports. These functions may be exerted by processing means common to a multiplicity of the ports or may be individual to each port. For the sake of simplicity, since FIGS. 1 and 2 represent known practice the representation in FIG. 2 does not follow the complex though well known architecture and processing protocols associated with Ethernet repeater hubs.

Broadly, associated with the bi-directional port 2a is a receiving function RX, a data processing function DP, various other functions (not illustrated for convenience), an auto-negotiation function AN and a transmit function TX under control of both the data processing function and the auto-negotiation. The data processing function is shown with a connection to a bus BUS that may convey data elsewhere in the hub, for example to other ports.

It is now presumed, in accordance with known practice, that the hub is capable of sending and receiving data from port 2a at any one of a plurality of different rates. For the sake of simplicity will be presumed that the rates are 10 megabits per second and 100 megabits per second. Obviously, if the end station were capable of transmission and reception only at the lower rate, the present invention would not apply. However, it is further presumed that the end station is capable of operation, namely data transmission and reception, at both a lower rate (10 megabits per second) and a higher rate, 100 megabits per second. The present invention would also be applicable where for example the repeater were capable of operating at three different rates and the end station were capable of operating at at least two or possibly three of those rates.

It is known, as indicated in the foregoing, for the hub to establish by interrogation of and response from the end station whether the end station is capable of operating at the higher of two rates and thereafter to cause the exchange of information at the higher rate.

Figure 3:
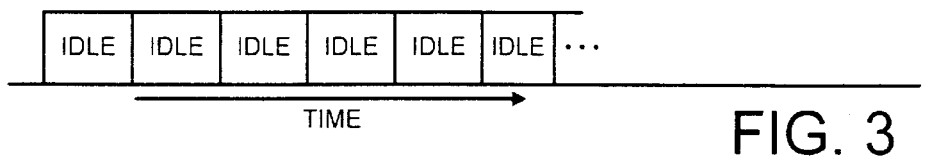
FIG. 3 illustrates a sequence of 'idle' symbols.

It is customary to maintain a connection by the transmission of a continuous sequence of symbols representing an idle state, as shown in FIG. 3. When either of the stations wishes to send data, it is then conventional for the end station to transmit a first predetermined symbol, and particularly a J-symbol, followed by a second predetermined symbol, particularly a K-symbol. The transmission of these two symbols in immediate sequence represents a 'start of carrier', and are the conventions digital version of what was originally an actual carrier wave in analog networks. The data then follows, particularly as defined in the aforementioned IEEE specification. At the end of the data packet a third predetermined symbol, particularly a T-symbol, is immediately followed by a fourth predetermined symbol, particularly an R symbol. These two immediately successive symbols represent the 'end of carrier'. The sequence is repeated for each and every package transmitted.

Figure 4:
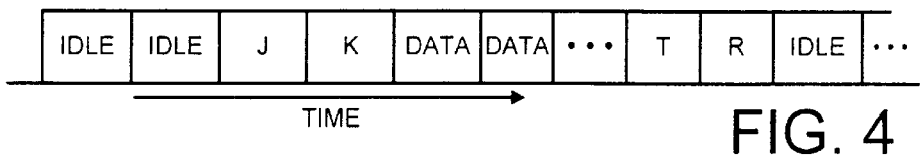
FIG. 4 illustrates a sequence of symbols representing the transmission of a data packet.

The transmission of a data packet following and preceding a sequence of idle symbols is shown in FIG. 4. Symbols J and K are followed by the data symbols, which are followed by the T and R symbols whereupon the transmission reverts to a continuous sequence of idle symbols.

Figure 5:
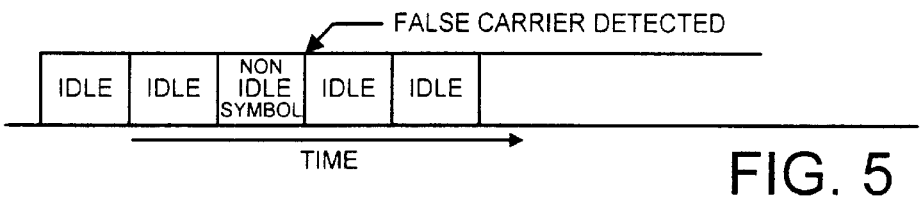
FIG. 5 illustrates the occurrence of a 'falsecarrier' error.

If the link between the stations is badly installed or is of inadequate performance specification then the symbol stream is liable to be corrupted. This is shown in FIG. 5, wherein a 'non idle' symbol has been transmitted, being an idle symbol corrupted to some other symbol.

Figure 6:
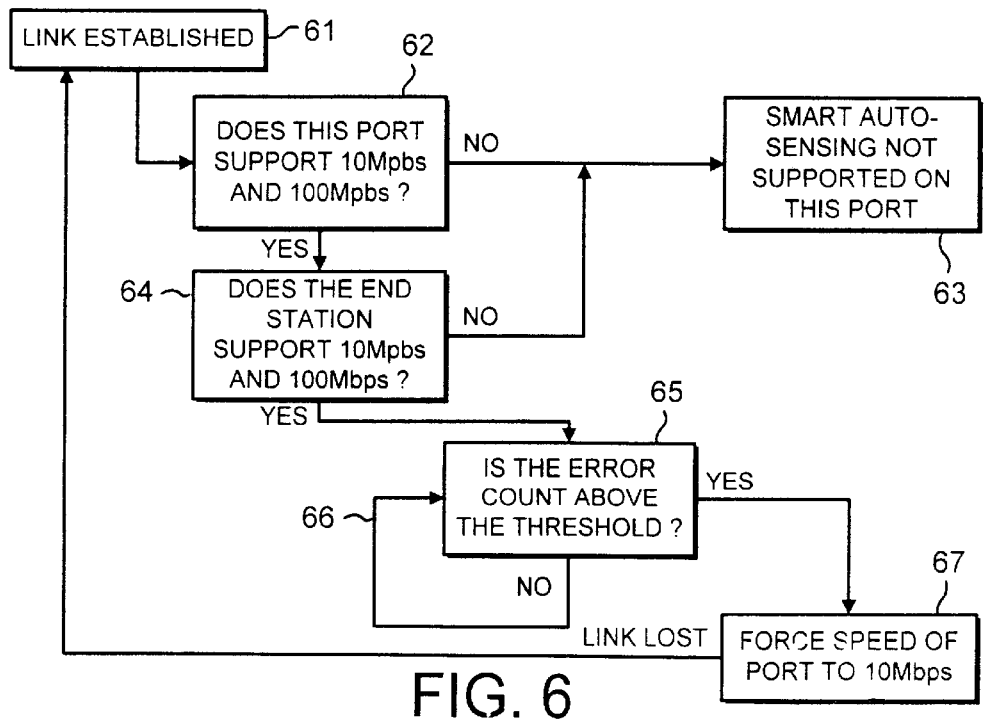
FIG. 6 is a flow diagram illustrating the operation of the invention.

FIG. 6 represents a flow diagram of a programme which may readily be implemented in the data processing function of a hub repeater as shown in FIGS. 1 and 2. It is presumed that auto-negotiation has established a connection at the higher of two rates. The auto-negotiation function follows the establishment of a link (stage 61) and comprises initially a determination whether the specific port supports data transmission at each of at least two rates (stage 62). If the port does not support data transmission at least two rates, then stage 63 indicates that the present invention cannot apply and the programme will not be implemented.

If however the port does support transmission at at least two rates, an enquiry is made (stage 64) whether the end station also supports data transmission at each of at least two rates. Obviously, if the end station does not do so, then the present invention will not apply and data will be transmitted at whatever rate the end station can support.

If the end station supports data transmission at both rates then, the process of auto-negotiation will result in the selection of the higher of the two rates (not specifically shown in FIG. 6). Thereafter the transmission of data between the stations is monitored to detect the occurrences of falsecarrier. The error rate is counted and compared with a threshold (stage 65). This is preferably done repeatedly, as shown in loop 66, throughout the maintenance of the data connection between the hub and the end station. Should the error rate exceed the threshold, then the data processing means produces a command forcing the speed of the port to 10 megabits per second, as shown by stage 67.

As indicated previously, the invention may be extended to a port capable of supporting three or more data rates so that if a operation at a given data rate produces an error rate exceeding a respective threshold the data rate determined for the port is downgraded to the next lower data rate and so on.

What is claimed is:

1. A method of controlling the rate of transmission of data between a network station having various ports and another station connected by way of a transmission link to one of said ports, wherein both the said network station and the other station are capable of receiving and transmitting data at any one of a defined plurality of standard data rates, said data rates comprising at least a higher rate and a lower rate, and wherein the said network station includes means for establishing by means of auto-negotiation whether data is to be transmitted between the said network station and the other station at the said higher rate, and further wherein a data connection between the said network station and the other station is maintained by the transmission of a continuous sequence of symbols representing an idle state, said method comprising:

(a) monitoring at the said network station the occurrence of an error represented by a symbol other than an idle state immediately followed by an idle state symbol;

(b) comparing a rate of occurrence of said errors with a threshold; and (c) forcing the data connection to proceed at the said lower rate if the aforementioned error rate exceeds the threshold.

2. A method according to claim 1 wherein a data packet transmitted from the said other station to the said network station commences with a first predetermined symbol followed by a second predetermined symbol and wherein said network station detects said errors by detecting the occurrence of said first predetermined symbol immediately followed by a symbol representing the idle state.

3. A method of controlling a data rate between a network station having various ports and another station connected by way of a link to one of said ports, wherein both the network station and the another station are capable of receiving and transmitting data at any one of a defined plurality of standard data rates, said data rates comprising at least a higher data rate and a lower data rate, said method comprising:

(a) establishing by way of auto-negotiation between said network station and said another station that data is to be transmitted on the link between the network station and the another station at the higher data rate;

(b) maintaining the link by the transmission of symbols representing an idle state;

(c) monitoring at the network station the occurrence of an error represented by a symbol other than an idle state immediately followed by an idle state symbol;

(d) comparing a rate of occurrence of such errors with a threshold; and (e) forcing the link to the lower data rate if the rate of occurrence exceeds the threshold.

4. A method according to claim 3 wherein a data packet transmitted from the other station to the network station commences with a first predetermined symbol followed by a second predetermined symbol, and wherein monitoring the occurrence of an error comprises:

detecting the occurrence of said first predetermined symbol immediately followed by a symbol representing the idle state.

5. A method of transmitting data on a link between a network station and a remote station, wherein the network station and the remote station are capable of receiving and transmitting data on the link at any one of a defined plurality of standard data rates, said data rates comprising at least a higher data rate and a lower data rate, the method comprising:

(a) establishing by way of auto-negotiation between the network station and the remote station that data is to be transmitted on the link between the network station and the remote station at the higher data rate;

(b) sending and receiving data on the link at the higher data rate, the data comprising data packets and groups of idle symbols;

(c) monitoring at the network station the occurrence of an error represented by a symbol other than an idle symbol within a group of idle symbols;

(d) comparing a rate of occurrence of such errors with a threshold; and (e) forcing the link to the lower data rate if the rate of occurrence exceeds the threshold.

6. A method according to claim 5 wherein each data packet commences with a first predetermined symbol followed by a second predetermined symbol and wherein monitoring the occurrence of an error comprises:

detecting the occurrence of said first predetermined symbol immediately followed by an idle symbol.

7. A network station having at least one port capable of receiving and transmitting data on a link between the port and a remote station at any one of a defined plurality of standard data rates, said data rates comprising at least a higher rate and a lower rate, and for transmitting and receiving data composed of defined data packets and groups of idle symbols, said station including:

(a) an auto-negotiation module for establishing on the link that data is to be transmitted on the link between the network station and the remote station at a data rate corresponding to the higher rate; and (b) a monitoring module which detects errors represented by the occurrence of a non-idle symbol within a group of idle symbols, compares a rate of occurrence of the errors with a threshold and forces the data rate to the lower rate if the rate of occurrence exceeds the threshold.

8. A network station according to claim 7 wherein each data packet commences with a first predetermined symbol followed by a second predetermined symbol, and wherein the monitoring module detects the occurrence of the first predetermined symbol immediately followed by an idle symbol.

* * * * *